(12) United States Patent
Chaumonnot et al.

(10) Patent No.: US 7,851,320 B2
(45) Date of Patent: Dec. 14, 2010

(54) MESOSTRUCTURED ALUMINOSILICATE MATERIAL

(75) Inventors: Alexandra Chaumonnot, Lyons (FR); Aurélie Coupe, Noisiel (FR); Clément Sanchez, Gif-sur-Yvette (FR); Patrick Euzen, Paris (FR); Cédric Boissiere, Paris (FR); David Grosso, Rueil Malmaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 0 days.

(21) Appl. No.: 12/408,437

(22) Filed: Mar. 20, 2009

(65) Prior Publication Data

US 2009/0232720 A1   Sep. 17, 2009

Related U.S. Application Data

(62) Division of application No. 11/159,384, filed on Jun. 23, 2005, now abandoned.

(30) Foreign Application Priority Data

Jun. 24, 2004   (FR)   .................................. 04 06938

(51) Int. Cl.
    *C01B 33/00*   (2006.01)
    *C01B 33/26*   (2006.01)
(52) U.S. Cl. ........................ 438/335; 438/336; 438/326; 438/328
(58) Field of Classification Search .................. 423/335, 423/336, 326, 328
    See application file for complete search history.

(56) References Cited

U.S. PATENT DOCUMENTS 5,922,299 A * 7/1999 Bruinsma et al. ........... 423/335
6,387,453 B1   5/2002 Brinker et al.
6,592,764 B1   7/2003 Stucky et al.
6,866,925 B1   3/2005 Chane-Ching
2004/0052714 A1 * 3/2004 Rojas et al. .................. 423/335
2004/0192947 A1   9/2004 Chane-Ching
2006/0030477 A1   2/2006 Chaumonnot et al.

FOREIGN PATENT DOCUMENTS

FR      2800300      5/2001
WO   WO 9937705      7/1999

OTHER PUBLICATIONS www.dictionary.com; Random House Dictionary; "Atomize".*

(Continued)

*Primary Examiner*—Jessica L Ward
*Assistant Examiner*—Erin B Saad
(74) *Attorney, Agent, or Firm*—Millen, White, Zelano, Branigan, P.C.

(57) ABSTRACT

A mesostructured aluminosilicate material is described, constituted by at least two spherical elementary particles, each of said spherical particles being constituted by a matrix based on silicon oxide and aluminum oxide, having a pore size in the range 1.5 to 30 nm, a Si/Al molar ratio of at least 1, having amorphous walls with a thickness in the range 1 to 20 nm, said spherical elementary particles having a maximum diameter of 10 μm. A process for preparing said material and its application in the fields of refining and petrochemistry are also described.

16 Claims, 2 Drawing Sheets

OTHER PUBLICATIONS www.dictionary.com; Random House Dictionary; "Aerosol".*

Galo J. De A.A. Soler-Illia; Clement Sanchez, Benedicte Lebeau, Joel Patarin: "Chemical Strategies to Design Textured Materials: From Microporous and Mesoporous Oxides to Nanonetworks and Hierarchical Structures" Chem. Rev., vol. 102, Oct. 25, 2002 pp. 4093-4138, XP002308089.

C.J. Brinker, Y.Lu, A. Sellinger, H. Fan: "Evaporation Induced Self-Assembly Nanostructures Made Easy" Advanced Materials, vol. 11, No. 7, 1999, pp. 579-585, XP002308090.

Arne Karlsson, Michael Stoecker, Ralf Schmidt: "Composites of Micro-and Mesoporous Materials: Simultaneous Syntheis of MFI/MCM-41 Like Phases by a Mixed Template Approach" Microporous and Microporous Materials, vol. 27, 1999, pp. 181-192, XP002308091.

U.S. Appl. No. 11/889,891 "Mesostructured Material with a High Aluminum Content"; filed Aug. 17, 2007.

* cited by examiner

MESOSTRUCTURED ALUMINOSILICATE MATERIAL

This application is a divisional of U.S. patent application Ser. No. 11/159,384, filed Jun. 23, 2005, which is abandoned.

The present invention relates to the field of mesostructured aluminosilicate materials with a high aluminium content. It also relates to the preparation of said materials which are obtained using the "aerosol" synthesis technique. The structural and textural properties of the materials of the invention and their acid-base properties render them particularly suitable for applications in the refining and petrochemicals fields.

PRIOR ART

Novel synthesis strategies for producing materials with a porosity which is well defined over a very broad range, from microporous materials to macroporous materials via materials with a hierarchical porosity, i.e. with pores of various sizes, have been under development in the scientific community since the middle of the 1990s (G J de A A Soler-Illia, C Sanchez, B Lebeau, J Patarin, Chem Rev 2002, 102, 4093). Materials are obtained in which the pore size is controlled. In particular, the development of syntheses using "mild chemistry" methods has led to the production of mesostructured materials at low temperature by the co-existence in aqueous solution or in highly polar solvents of inorganic precursors with templates, generally ionic or neutral molecular or supramolecular surfactants. Controlling the electrostatic interactions or hydrogen bonding between the inorganic precursors and the template jointly with hydrolysis/condensation reactions of the inorganic precursor has led to a cooperative organization of organic and inorganic phases generating micellar aggregates of surfactants of controlled uniform size in an inorganic matrix. This cooperative self-organization phenomenon governed, inter alia, by the concentration of the template, may be induced by progressive evaporation of a solution of reagents in which the concentration of the template is lower than the critical micellar concentration, which leads either to the formation of mesostructured films in the case of deposition onto a substrate (dip-coating) or to the formation of a mesostructured powder when the solution is atomized (aerosol technique). As an example, U.S. Pat. No. 6,387,453 discloses the formation of mesostructured organic-inorganic hybrid films using the dip coating technique, the same authors having also used the aerosol technique to produce purely silicic mesostructured materials (C J Brinker, Y Lu, A Sellinger, H Fan, Adv Mater 1999, 11, 7). The pores are then released by eliminating the surfactant, this being carried out conventionally by chemical extraction or by heat treatment. Several classes of mesostructured materials have been developed using the different natures of the inorganic precursors and the template employed as well as the operating conditions imposed. As an example, the M41S class initially developed by Mobil (J S Beck, J C Vartuli, W J Roth, M E Leonowicz, C T Kresge, K D Schmitt, C T-W Chu, D H Olson, E W Sheppard, S B McCullen, J B Higgins, J L Schlenker, J Am Chem Soc, 1992, 114, 27, 10834) constituted by mesoporous materials obtained using ionic surfactants such as quaternary ammonium salts, having a generally hexagonal, cubic or lamellar structure, pores of uniform size in the range 1.5 to 10 nm and amorphous walls with a thickness of the order of 1 to 2 nm, has been widely studied. Subsequently, to increase the hydrothermal stability while developing the acid-basic properties relative to said materials, incorporation of elemental aluminium into the amorphous silicic framework by direct synthesis or by post-synthesis processes have been particularly regarded, the aluminosilicate materials obtained having a Si/Al molar ratio in the range 1 to 1000 (S Kawi, S C Chen, Stud Surf Sci Catal 2000, 129, 227; S Kawi, S C Shen, Stud Surf Sci Catal 2000, 129, 219; R Mokaya, W Jones, Chem Commun 1997, 2185). The hydrothermal stability and acid-basic properties developed by such aluminosilicates, however, did not allow them to be used on an industrial scale in refining processes or in petrochemistry, which has steadily led to the use of novel templates such as block copolymer type amphiphilic macromolecules, these latter producing mesostructured materials having a generally hexagonal, cubic or lamellar structure, with uniform sized pores in the range 4 to 50 nm and amorphous walls with a thickness in the range 3 to 7 nm. In contrast to dip-coating or aerosol techniques described above, the materials thus defined are not obtained by progressive concentration of inorganic precursors and the template in an aqueous solution in which they are present, but are conventionally obtained by direct precipitation in an aqueous solvent or in high polarity solvents by adjusting the value of the critical micellar concentration of the template. Further, synthesis of such materials obtained by precipitation necessitates a step for autoclave ageing and not all of the reagents are integrated into the products in stoichiometric quantities as they can be found in the supernatant. Depending on the structure and desired degree of organization for the final mesostructured material, such synthesis methods may take place in an acidic medium (pH approx 1) (International patent application WO-A-99/37705) or in a neutral medium (WO-A-96/39357), the nature of the template used also playing a major role. The elementary particles obtained do not have a regular form and are generally characterized by dimensions of over 500 nm. The mesostructured aluminosilicate materials obtained have enhanced hydrothermal stability properties compared with their homologues synthesized using other templates, their acid-basic properties remaining very similar (1<Si/Al<1000). Low values for the molar ratio Si/Al are, however, difficult to obtain as it is difficult to incorporate large quantities of aluminium into the material using such particular operating procedures (D Zaho, J Feng, Q Huo, N Melosh, G H Fredrickson, B F Chmelke, G D Stucky, Science, 1998, 279, 548; Y-H Yue, A Gédéon, J-L Bonardet, J B d'Espinose, N Melosh, J Fraissard, Stud Surf Sci Catal 2000, 129, 209).

SUMMARY OF THE INVENTION

The invention concerns a mesostructured aluminosilicate material constituted by at least two spherical elementary particles, each of said spherical particles being constituted by a matrix based on silicon oxide and aluminium oxide, having a pore size in the range 1.5 to 30 nm, a Si/Al molar ratio of at least 1, having amorphous walls with a thickness in the range 1 to 20 nm, said spherical elementary particles having a maximum diameter of 10 μm. The material of the invention has a high aluminium content and the Si/Al molar ratio is preferably in the range 1 to 10. The present invention also concerns a process for preparing the material of the invention: it is obtained by interacting at least one ionic or non ionic surfactant with at least one aluminic precursor and at least one silicic precursor, preferably in an acidic medium, the ordered structure of the material following on from micellization or self-organization by evaporation induced by the aerosol technique.

APPLICATION OF THE INVENTION

The aluminosilicate material of the invention is a mesostructured material constituted by spherical elementary particles, each of said particles being constituted by a matrix based on silicon oxide and aluminium oxide. Said matrix is mesostructured and has amorphous walls with a thickness in the range 1 to 20 nm, a uniform pore size in the range 1.5 to 30 nm and with a molar ratio Si/Al of at least 1. Said spherical elementary particles advantageously have a diameter in the range 50 nm to 10 μm, preferably in the range 50 to 300 nm, the limited size of said particles and their perfectly spherical form allowing better diffusion of compounds when using the material of the invention as a catalyst or adsorbant for applications in the field of refining and petrochemistry, compared with known prior art materials in the form of elementary particles with a non homogeneous shape, i.e. irregular particles, and with a dimension which is generally over 500 nm. The matrix constituting each of said particles of the material of the invention advantageously has a Si/Al molar ratio in the range 1 to 10, more advantageously in the range 1 to 5: the material of the invention has a high aluminium content, which endows the material of the invention with advantageous acid-base properties for catalysis applications. The material of the invention is also particularly advantageous for the organized porosity it has on the mesopore scale.

DESCRIPTION OF THE INVENTION

The present invention provides a mesostructured aluminosilicate material constituted by at least two spherical elementary particles, each of said spherical particles being constituted by a matrix based on silicon oxide and aluminium oxide, having a pore size in the range 1.5 to 30 nm, a Si/Al molar ratio of at least 1, having amorphous walls with a thickness in the range 1 to 20 nm, said spherical elementary particles having a maximum diameter of 10 μm.

In accordance with the invention, the matrix based on silicon oxide and aluminium oxide constituting each of said spherical particles of the aluminosilicate material of the invention advantageously has a high aluminium content: the Si/Al molar ratio is preferably in the range 1 to 10, and more preferably in the range 1 to 5.

The term "mesostructured material" as used in the present invention means a material having organized porosity on the mesopore scale in each of said spherical particles, i.e. an organized porosity on the scale of pores having a uniform dimension in the range 1.5 to 30 nm, preferably in the range 1.5 to 10 nm, distributed homogeneously and in a regular manner in each of said particles (mesostructure of material).

The material located between the mesopores of each of said spherical particles of the material of the invention is amorphous and in the form of walls the thickness of which is in the range 1 to 20 nm. The thickness of the walls corresponds to the distance separating one pore from another pore. The organization of the mesoporosity described above results in structuring of the matrix based on silicon oxide and aluminium oxide, which may be hexagonal, two-dimensionally hexagonal, vermicular or cubic, preferably vermicular.

In accordance with the invention, the maximum diameter of said spherical elementary particles constituting the material of the invention is 10 μm, preferably in the range 50 nm to 10 Mm, and more advantageously in the range 50 to 300 nm. More precisely, said particles are present in the material of the invention in the form of aggregates.

The material of the invention advantageously has a specific surface area in the range 100 to 1200 $m^2/g$, more advantageously in the range 300 to 1000 $m^2/g$.

The present invention also concerns the preparation of the material of the invention. Said process comprises a) mixing, in solution, at least one surfactant, at least one aluminic precursor and at least one silicic precursor; b) atomizing by aerosol the solution obtained in a) to produce spherical droplets with a diameter of less than 200 μm; c) drying said droplets and d) eliminating said surfactant to obtain a material with a mesostructured porosity.

The silicic and aluminic precursors used in step a) of the process of the invention are inorganic oxide precursors that are well known to the skilled person. The silicic precursor is obtained from any source of silicon and advantageously from a sodium silicate precursor with formula $SiO_2$, NaOH, from a chlorine-containing precursor with formula $SiCl_4$, from an organometallic precursor with formula $Si(OR)_4$ in which R=H, methyl, ethyl or from a chloroalkoxide precursor with formula $Si(OR)_{4-x}Cl_x$ in which R=H, methyl, ethyl, x being in the range 0 to 4. The silicic precursor may also advantageously be an organometallic precursor with formula $Si(OR)_{4-x}R'_x$ in which R=H, methyl, ethyl and R' is an alkyl chain or a functionalized alkyl chain, for example a thiol, amino, β-diketone or sulphonic acid group, x being in the range 0 to 4. The aluminic precursor is advantageously an inorganic aluminium salt with formula $AlX_3$, X being a halogen or the $NO_3$ group. Preferably, X is chlorine. The aluminic precursor may also be an organometallic precursor with formula $Al(OR'')_3$ in which R''=ethyl, isopropyl, b-butyl, s-butyl or t-butyl or a chelated precursor such as aluminium acetylacetonate $(Al(CH_7O_2)_3)$. The aluminic precursor may also be an aluminium oxide or hydroxide.

The surfactant used to prepare the mixture of step b) of the preparation process of the invention is an ionic or non ionic surfactant or a mixture of the two. Preferably, the ionic surfactant is selected from phosphonium or ammonium ions, and more preferably from quaternary ammonium salts such as cetyltrimethyl ammonium bromide (CTAB). Preferably, the non ionic surfactant may be any copolymer having at least two portions with different polarities endowing them with amphiphilic macromolecular properties. Said copolymers may be included in the following non exhaustive list of copolymer classes: fluorinated copolymers ($—[CH_2—CH_2—CH_2—CH_2O—CO—R1-$ in which $R1=C_4F_9, C_8F_{17}$, etc), biological copolymers such as poly amino acids (polylysine, alginates, etc), dendrimers, block copolymers constituted by chains of poly(alkylene oxide) and any other copolymer with an amphiphilic nature which is known to the skilled person (S Forster, M Antionnetti, Adv Mater, 1998, 10, 195-217, S Forster, T Plantenberg, Angew Chem Int Ed, 2002, 41, 688-714, H Colfen, Macromol Rapid Commun, 2001, 22, 219-252). Preferably, in the context of the present invention, a block copolymer constituted by poly (alkylene oxide) chains is used. Said block copolymer is preferably a block copolymer having two, three of four blocks, each block being constituted by one poly(alkylene oxide) chain. For a two-block copolymer, one of the blocks is constituted by a poly (alkylene oxide) chain which is hydrophilic in nature and the other block is constituted by a poly(alkylene oxide) chain which is hydrophobic in nature. For a three-block copolymer, two of the blocks are constituted by a poly(alkylene oxide) chain which is hydrophilic in nature while the other block, located between two blocks with hydrophilic portions, is constituted by a poly(alkylene oxide) chain which is hydrophobic in nature. Preferably, in the case of a three-block copolymer, the chains of poly(alkylene oxide) of hydrophilic nature are chains of poly(ethylene oxide), $(PEO)_x$ and $(PEO)_z$, and the poly(alkylene oxide) chains which are hydrophobic in nature are chains of poly (propylene oxide), $(PPO)_y$, chains of poly(butylene oxide) or mixed chains, each chain of which is a mixture of several alkylene oxide monomers. More preferably, in the case of a three-block copolymer, a compound with formula $(PEO)_x(PPO)_y(PEO)_z$ is used in which x is in the range 5 to 106, y is in the range 33 to 70 and z is in the range 5 to 106. Preferably, the values of x and z are identical. Highly advantageously, a compound in which x 20, y=70 and z=20 (P123) is used and a compound in which x=106, y=70 and z=106 (F127) is used. Commercially available non ionic surfactants known as Pluronic (BASF), Tetronic (BASF), Triton (Sigma), Tergitol (UnionCarbide), Brij (Aldrich) can be used as non ionic surfactants in step a) of the preparation process of the invention. For a four-block copolymer, two of the blocks are constituted by a poly(alkylene oxide) chain which is hydrophilic in nature and the two other blocks are constituted by a poly(alkylene oxide) chain which is hydrophobic in nature.

The solution into which the following are mixed: at least one silicic precursor, at least one aluminic precursor and at least one surfactant in accordance with step a) of the preparation process of the invention, may be acidic, neutral or basic. Preferably, said solution is acidic and has a maximum pH of 2, more preferably in the range 0 to 2. Non limiting examples of acids used to obtain an acidic solution with a maximum pH of 2 are hydrochloric acid, sulphuric acid and nitric acid. Said solution may be aqueous or it may be a water-organic solvent mixture, the organic solvent preferably being a polar solvent, in particular an alcohol, preferably ethanol. Said solution may also be practically organic, preferably practically alcoholic, the quantity of water being such that hydrolysis of the inorganic precursors is ensured (stoichiometric quantity). More preferably, said solution in which the following are mixed: at least one silicic precursor, at least one aluminic precursor and at least one surfactant is a hydro-organic acid mixture, more preferably an acidic water-alcohol mixture.

The concentrations of silicic and aluminic precursors are defined by the molar ratio Si/Al, this being at least equal to 1, preferably in the range 1 to 1000, and more preferably in the range 1 to 10 and highly preferably in the range 1 to 5. The initial concentration of surfactant introduced into the mixture of step a) of the preparation process of the invention is defined by $c_0$ which is defined with respect to the critical micellar concentration ($c_{mc}$) which is well known to the skilled person. The $c_{mc}$ is the limiting concentration beyond which self-arrangement of the molecules of surfactant in the solution occurs. The concentration $c_0$ may be less than, equal to or more than $c_{mc}$, preferably less than $c_{mc}$. In a preferred implementation of the process of the invention, the concentration $c_0$ is less than the $c_{mc}$ and said solution in step a) of the preparation process of the invention is an acidic water-alcohol acidic mixture.

The step for atomizing a mixture in step b) of the preparation process of the invention produces spherical droplets with a diameter which is preferably in the range 2 to 200 µm. The size distribution of said droplets is of the log normal type. The aerosol generator used is a commercial model 3078 apparatus supplied by TSI. The solution is atomized into a chamber into which a vector gas is sent, an $O_2/N_2$ mixture (dry air), at a pressure P of 1.5 bars. In step c) of the preparation process of the invention, said droplets are dried. Drying is carried out by transporting said droplets via the vector gas, the $O_2/N_2$ mixture, in glass tubes, which results in progressive evaporation of the solution, for example of the hydro-organic acid solution, and the production of spherical elementary particles. Drying is completed by passing said particles into an oven the temperature of which can be adjusted, usually between temperatures of 50° C. to 600° C. and preferably 80° C. to 400° C., the residence time for said particles in the oven being of the order of 3 to 4 seconds. The particles are then harvested in a filter and constitute the material of the invention. A pump placed at the end of the circuit routes the species into the experimental aerosol device.

In the case in which the solution in step a) of the preparation process of the invention is a water-organic solvent mixture, preferably acidic, it is preferable during step a) of the preparation process of the invention that the concentration of surfactant at the start of mesostructuring of the matrix is less than the critical micellar concentration so that evaporation of said hydro-organic solution, preferably acidic, during step b) of the preparation process of the invention using the aerosol technique induces a phenomenon of micellization or self-organization leading to mesostructuring of the matrix of material of the invention. When $c_0 < c_{mc}$, mesostructuring of the matrix of the material of the invention prepared using the process described above follows progressive concentration of the silicic precursor in each droplet, of the aluminic precursor, and of the surfactant, until a concentration of surfactant $c > c_{mc}$ results from evaporation of the hydro-organic solution, preferably acidic.

In general, increasing the joint concentration of the silicic precursor and an aluminic precursor and the surfactant causes precipitation of the silicic and aluminic precursors around the self-organized surfactant and as a consequence, structuration of the matrix of the material of the invention. The inorganic/inorganic phase, organic/organic phase and organic/inorganic phase interactions result in a self-organization mechanism which is cooperative with hydrolysis/condensation of the silicic and aluminic precursors around the surfactant. The aerosol technique is particularly advantageous for carrying out step b) of the preparation process of the invention to constrain the reagents present in the initial solution to interact together, with no possible loss of material apart from the solvents, the totality of the aluminium and silicon elements initially present then being perfectly preserved throughout the process of the invention instead of being eliminated during the filtering steps and washes encountered in conventional synthesis processes known to the skilled person.

Elimination of the surfactant in step d) of the preparation process of the invention to obtain the material of the invention with a mesostructured porosity is advantageously carried out by chemical extraction or heat treatment, preferably by calcining in air within a temperature range of 300° C. to 1000° C. and more precisely in a range of 500° C. to 600° C. for a period of 1 to 24 hours, preferably for a period of 2 to 6 hours.

The mesostructured aluminosilicate material with a high aluminium content of the present invention may be obtained in the form of powder, beads, pellets, granules or extrudates, the forming operations being carried out using conventional techniques which are known to the skilled person. Preferably, the mesostructured aluminosilicate material of the invention is obtained in the form of a powder which is constituted by spherical elementary particles having a maximum diameter of 10 µm, preferably in the range 50 to 300 nm, which facilitates any diffusion of the compounds in the case of the use of a material of the invention as a catalyst or adsorbant in refining or petrochemicals applications.

The mesostructured aluminosilicate material of the invention is characterized using several analytical techniques, in particular by small angle X ray diffraction (small angle XRD), the nitrogen adsorption isotherm, transmission electron microscopy (TEM) and X ray fluorescence elementary analysis. Small angle X ray diffraction (values of 2θ in the range 0.5° to 3°) can be used to characterize the periodicity on a nanometric scale generated by the organized mesoporosity of the mesostructured matrix of the material of the invention. In the description below, X ray analysis is carried out on powder with a diffractometer operating in reflection equipped with a back monochromator using the copper radiation line (wavelength 1.5406 Å). The peaks normally observed on diffractograms corresponding to a given value for the angle 2θ are associated with the interplanar spacings $d_{hkl}$ which are characteristic of the structural symmetry of the material, (hkl being the Miller indices of the reciprocal lattice) by the Bragg relationship: $2d_{hkl}*\sin(\theta)=n*\lambda$. This indexation allows the lattice parameters (a, b, c) of the framework to be determined directly, the lattice parameters being a function of the hexagonal, cubic or vermicular structure obtained. As an example, the small angle X ray diffractogram of a mesostructured aluminosilicate material obtained using the process of the invention with a particular block copolymer, poly(ethylene oxide)$_{20}$-poly(propylene oxide)$_{70}$-poly(ethylene oxide)$_{20}$ (PEO$_{20}$-PPO$_{70}$-PEO$_{20}$ or Pluronic 123) has a correlation peak which is perfectly resolved which corresponds to a correlation distance d between pores characteristic of a vermicular structure and defined using the Bragg relationship: $2d*\sin(\theta)=n*\lambda$.

Nitrogen adsorption isothermal analysis corresponding to the physical adsorption of nitrogen molecules in the pores of the material on progressively increasing the pressure at constant temperature provides information regarding the textural characteristics which are peculiar to the material of the invention. In particular, it provides access to the specific surface area and to the mesoporous distribution of the material. The term "specific surface area" means the BET specific surface area ($S_{BET}$ in m$^2$/g) determined by nitrogen adsorption in accordance with American standard ASTM D 3663-78 established using the BRUNAUER-EMMETT-TELLER method described in the periodical "The Journal of the American Society", 60, 309, (1938). The pore distribution representative of a population of mesopores centered in a range of 1.5 to 50 nm is determined using the Barrett-Joyner-Halenda (BJH) model. The nitrogen adsorption-desorption isotherm using the BJH model is described in the periodical "The Journal of the American Society", 73, 373 (1951) written by E P Barrett, L G Joyner and P P Halenda. In the description below, the mesopore diameter φ in a given mesostructured matrix corresponds to the mean diameter for nitrogen desorption defined as a diameter such that all pores with less than that diameter constitute 50% of the pore volume (Vp) measured on the desorption arm of the nitrogen isotherm. Further, the shape of the nitrogen adsorption isotherm and the hysteresis loop provides information regarding the nature of the microporosity. As an example, the nitrogen adsorption isotherm of a mesostructured aluminosilicate material of the invention using a particular block copolymer, poly(ethylene oxide)$_{20}$-poly(propylene oxide)$_{70}$-poly(ethylene oxide)$_{20}$ (PEO$_{20}$-PPO$_{70}$-PEO$_{20}$ or Pluronic 123, P123) has a type IV isotherm and a type H1 hysteresis loop, the associated pore distribution curve being representative of a population of mesopores with a uniform size centered in a range of 1.5 to 30 nm. The difference between the value for the pore diameter φ and the correlation distance between pores d defined by small angle XRD as described above provides access to the dimension e in which e=d−φ and is characteristic of the thickness of the amorphous walls of the mesostructured matrix of the invention.

Transmission electron microscope analysis (TEM) is a technique which is also widely used to characterize the structure of these materials. This allows the formation of an image of the solid being studied, the contrasts observed being characteristic of the structural organization, texture or morphology of the particles observed, the resolution reaching a maximum of 0.2 nm. In the description below, TEM images were produced from microtomed sections of the sample to visualize a section of a spherical elementary particle of the material of the invention. As an example, TEM images obtained for a mesostructured aluminosilicate material of the invention obtained using the process of the invention with a copolymer as described above, namely a particular block copolymer, Pluronic 123, had spherical elementary particles with a vermicular mesostructure, the material being defined by the dark zones. Analysis of the image also provides access to the parameters d, φ and e, characteristic of the mesostructured matrix defined above.

The morphology and dimensional distribution of the elementary particles were established from analysis of the images obtained by SEM (scanning electron microscopy).

The structure of the mesostructured matrix constituting each of the particles of the material of the invention may be cubic, vermicular or hexagonal depending on the nature of the support selected as the template. As an example, a mesostructured aluminosilicate material obtained as described above using a particular block copolymer, poly(ethylene oxide)$_{20}$-poly(propylene oxide)$_{70}$-poly(ethylene oxide)$_{20}$ (PEO$_{20}$-PPO$_{70}$-PEO$_{20}$ or Pluronic 123, P123) has a vermicular structure.

The present invention concerns the use of a mesostructured aluminosilicate material of the invention as an adsorbant for controlling pollution or as a molecular sieve for separation. The present invention thus provides an adsorbant comprising the mesostructured aluminosilicate material of the invention. It is also advantageously used as an acidic solid to catalyze reactions, for example those occurring in the refining and petrochemistry fields.

When the mesostructured aluminosilicate material of the invention is used as a catalyst, said material may be associated with an inorganic matrix, which may be inert or catalytically active, and a metallic phase. The inorganic matrix may simply be present as a binder to keep together the particles of said material in the various known forms for catalysts (extrudates, pellets, beads, powder) or it may be added as a diluent to impose a degree of conversion on the process which would otherwise run away, leading to clogging of the catalyst due to the formation of too large an amount of coke. Typical inorganic matrices are support materials for catalysts such as the various forms of silica, alumina, silica-alumina, magnesia, zirconia, titanium and boron oxides, aluminium, titanium or zirconium phosphates, clays such as kaolin, bentonite, montmorillonite, sepiolite, attapulgite, Fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds. The inorganic matrix may be a mixture of different compounds, in particular of an inert phase and an active phase. Said material of the present invention may also be associated with at least one zeolite and may act as the principal active phase or as an additive. The metallic phase may be introduced integrally onto said material of the invention. It may also be introduced integrally into the inorganic matrix or onto the inorganic matrix—mesostructured solid ensemble by ion exchange or impregnation with cations or oxides selected from the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic table.

The catalytic compositions comprising the material of the present invention are generally suitable for carrying out the principal processes for hydrocarbon transformation and organic compound synthesis reactions.

The catalytic compositions comprising the material of the invention advantageously have applications in the reactions of isomerization, transalkylation and dismutation, alkylation and dealkylation, hydration and dehydration, oligomerization and polymerization, cyclization, aromatization, cracking, reforming, hydrogenation and dehydrogenation, oxidation, halogenation, hydrocracking, hydroconversion, hydrotreatment, hydrodesulphurization and hydrodenitrogenation, catalytic elimination of oxides of nitrogen, said reaction involving feeds comprising saturated and unsaturated aliphatic hydrocarbons, aromatic hydrocarbons, organic oxygen-containing compounds and organic compounds containing nitrogen and/or sulphur as well as organic compounds containing other functional groups.

The invention will now be illustrated in the following examples.

EXAMPLES

In the examples below, the aerosol technique used is that described above in the description of the invention.

Example 1 (Invention)

Preparation of an Aluminosilicate Material with a Si/Al Ratio of 5

Figure 1:
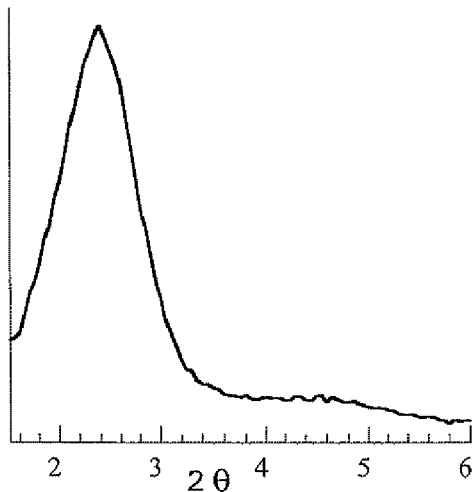
FIG. 1 represents an X-ray diffraction diagram of a solid of the invention.
Figure 2:
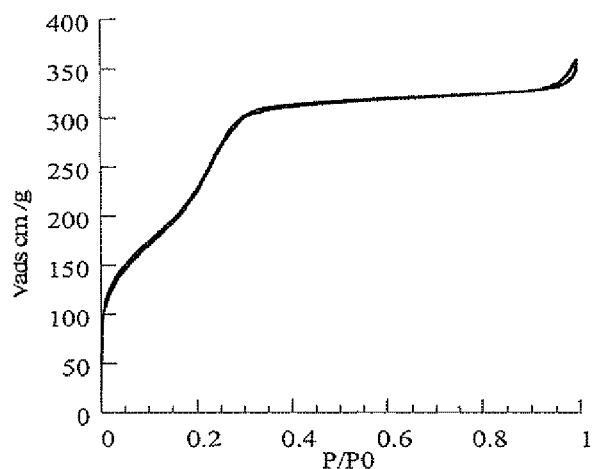
FIG. 2 a nitrogen adsorption isotherm.
Figure 3:
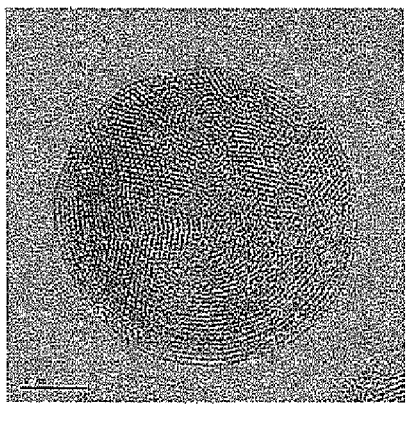
FIG. 3 a TEM of the solid.

1.03 g of aluminium trichloride was added to a solution containing 30 g of ethanol, 14.5 g of water, 0.036 ml of HCl and 1.4 g of the surfactant CTAB. The ensemble was left at ambient temperature, with stirring, until the aluminic precursor had completely dissolved. 3.59 g of tetraethylorthosilicate (TEOS) was then added. After stirring for 10 min at ambient temperature, the ensemble was sent to the atomization chamber of an aerosol generator as described above and the solution was atomized in the form of fine droplets under the action of the vector gas (dry air) introduced under pressure (P=1.5 bars) as described above. The droplets were dried using the protocol described in the invention described above. The temperature of the drying oven was fixed at 350° C. The harvested powder was then calcined in air for 5 h at T=550° C. The solid was characterized by small angle XRD (FIG. 1), by the nitrogen adsorption isotherm (FIG. 2: the indication P0 shown along the abscissa is the saturated vapour pressure), by TEM (FIG. 3) and by X ray fluorescence. TEM analysis showed that the final material had an organized mesoporosity characterized by a vermicular structure. The nitrogen adsorption isothermal analysis produced a specific surface area in the final material of $S_{BET}$=800 m$^2$/g and a mesopore diameter of $\phi$=2.4 nm. Small angle XRD showed a correlation peak at an angle 2θ of 2.4. The Bragg relationship, 2d*sin(1.2)=1.5406, allowed the correlation distance d between the pores of the mesostructured matrix to be calculated, namely d=3.7 nm. The thickness of the walls of the mesostructured material defined by e=d−$\phi$ was thus e=1.3 nm. A SEM image of the spherical elementary particles obtained indicated that the particle size was characterized by a diameter of 50 to 700 nm, with a particle size distribution being centred around 300 nm.

Example 2 (Invention)

Preparation of an Aluminosilicate Material with a Si/Al Ratio of 10

Figure 6:
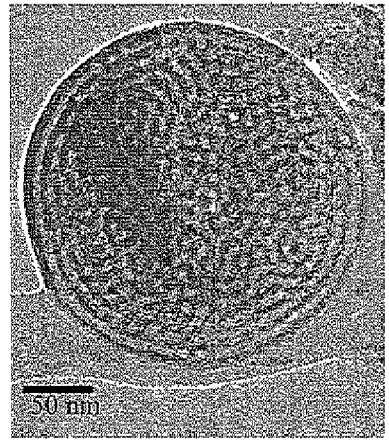
FIGS. 4, 5 and 6 correspondingly represent XRD, nitrogen adsorption isotherm and TEM of another solid of the invention.
Figure 4:
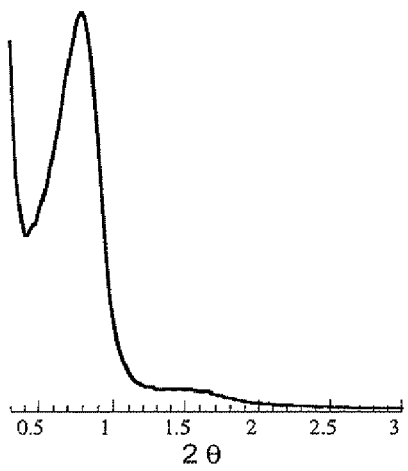
Figure 5:
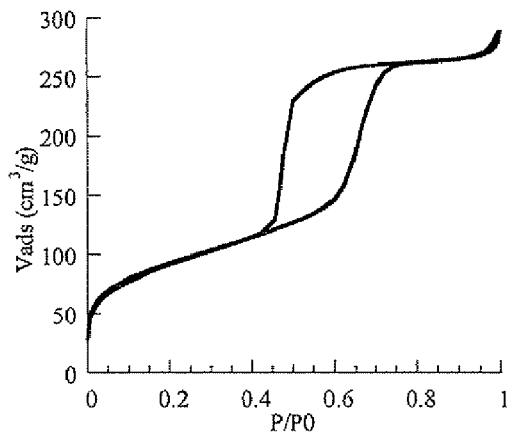

0.52 g of aluminium trichloride was added to a solution containing 30 g of ethanol, 14.7 g of water, 0.036 ml of HCl and 1.4 g of the surfactant P123. The ensemble was left at ambient temperature, with stirring, until the aluminic precursor had completely dissolved. 4.09 g of tetraethylorthosilicate (TEOS) was then added. After stirring for 18 hours at ambient temperature, the ensemble was sent to the atomization chamber of an aerosol generator and the solution was atomized in the form of fine droplets under the action of the vector gas (dry air) introduced under pressure (P=1.5 bars). The droplets were dried using the protocol described in the invention described above. The temperature of the drying oven was fixed at 350° C. The harvested powder was then calcined in air for 5 h at T=550° C. The solid was characterized by small angle XRD (FIG. 4), by the nitrogen adsorption isotherm (FIG. 5: the indication P0 shown along the abscissa is the saturated vapour pressure), by TEM (FIG. 6) and by X ray fluorescence. TEM analysis showed that the final material had an organized mesoporosity characterized by a vermicular structure. The nitrogen adsorption isothermal analysis produced a specific surface area in the final material of $S_{BET}$=320 m$^2$/g and a mesopore diameter of $\phi$=5.3 nm. Small angle XRD showed a correlation peak at an angle 2θ of 0.72. The Bragg relationship, 2d*sin(0.36)=1.5406 allowed the correlation distance d between the pores of the mesostructured matrix to be calculated, namely d=12.2 nm. The thickness of the walls of the mesostructured material defined by e=d−$\phi$ was thus e=6.9 nm. A SEM image of the spherical elementary particles obtained indicated that the particle size was characterized by a diameter of 50 to 700 nm, with a particle size distribution being centred around 300 nm.

Example 3 (Invention)

Preparation of an Aluminosilicate Material with a Si/Al Ratio of 3

Figure 7:
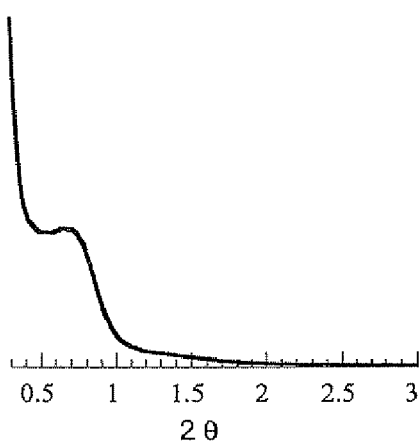
FIGS. 7 and 8 respectively represent XRD and nitrogen adsorption isotherm of yet another solid of the invention.
Figure 8:
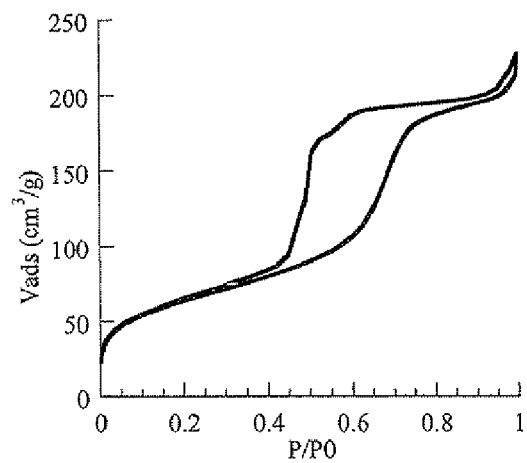

1.56 g of aluminium trichloride was added to a solution containing 30 g of ethanol, 14.2 g of water, 0.036 ml of HCl and 1.4 g of the surfactant P123. The ensemble was left at ambient temperature, with stirring, until the aluminic precursor had completely dissolved. 3.14 g of tetraethylorthosilicate (TEOS) was then added. After stirring for 18 hours at ambient temperature, the ensemble was sent to the atomization chamber of an aerosol generator as described above and the solution was atomized in the form of fine droplets under the action of the vector gas (dry air) introduced under pressure (P=1.5 bars). The droplets were dried using the protocol described in the invention described above. The temperature of the drying oven was fixed at 350° C. The harvested powder was then calcined in air for 5 h at T=550° C. The solid was characterized by small angle XRD (FIG. 7), by the nitrogen adsorption isotherm (FIG. 8: the indication P0 shown along the abscissa is the saturated vapour pressure), by TEM and by X ray fluorescence. TEM analysis showed that the final material had an organized mesoporosity characterized by a vermicular structure. The nitrogen adsorption isothermal analysis produced a specific surface area in the final material of $S_{BET}$=220 m$^2$/g and a mesopore diameter of $\phi$=5.9 nm. Small angle XRD showed a correlation peak at an angle 2θ of 0.72. The Bragg relationship, 2d*sin(0.36)=1.5406 allowed the correlation distance d between the pores of the mesostructured matrix to be calculated, namely d=12.2 nm. The thickness of the walls of the mesostructured material defined by e=d−ϕ was thus e=6.3 nm. A SEM image of the spherical elementary particles obtained indicated that the particle size was characterized by a diameter of 50 to 700 nm, with a particle size distribution being centred around 300 nm.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 0406938, filed Jun. 24, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparing a mesostructured aluminosilicate material comprising at least two spherical elementary particles, each of said spherical particles being constituted by a mesostructured matrix based on silicon oxide and aluminium oxide, having a pore size in the range 1.5 to 30 nm, a Si/Al molar ratio of at least 1, having amorphous walls with a thickness in the range 1 to 20 nm, said spherical elementary particles having a maximum diameter of 10 μm, said process comprising a) mixing at least one surfactant, at least one aluminic precursor and at least one silicic precursor to form a solution; b) atomizing a solution obtained in a) in a chamber by spraying a vector gas into the chamber to produce spherical droplets with a diameter of less than 200 μm; c) drying said droplets and d) eliminating said surfactant to obtain a material with a mesostructured porosity.

2. A process according to claim 1, in which the Si/Al molar ratio is in the range 1 to 10.

3. A process according to claim 1, in which the material has a Si/Al molar ratio is in the range 1 to 5.

4. A process according to claim 1, in which the material has a pore size of said matrix is in the range 1.5 to 10 nm.

5. A process according to claim 1, in which the material has a diameter of said spherical elementary particles is in the range 50 to 300 nm.

6. A process according to claim 1, in which the material has a specific surface area in the range 100 to 1200 m$^2$/g.

7. A process according to claim 1, in which the material has a specific surface area in the range 300 to 1000 m$^2$/g.

8. A process according to claim 1, in which in the material said matrix based on silicon oxide and aluminium oxide has a hexagonal, vermicular or cubic structure.

9. A process according to claim 1, in which the silicic precursor is an organometallic precursor with formula Si(OR)$_4$ in which R=H, methyl or ethyl.

10. A process according to claim 1, in which the aluminic precursor is an inorganic aluminium salt with formula AlX$_3$, X being a halogen or an NO$_3$ group.

11. A process according to claim 1, in which the surfactant is an ionic surfactant selected from phoshonium and ammonium ions.

12. A process according to claim 1, in which the surfactant is a non ionic surfactant in the form of a copolymer having at least two portions with differing polarities.

13. A process according to claim 12, in which said copolymer is a block copolymer containing two, three or four blocks, each block being a poly(alkylene oxide) chain.

14. A process according to claim 13, in which the non ionic surfactant is poly(ethylene oxide)$_{20}$-poly(propylene oxide)$_{70}$-poly(ethylene oxide)$_{20}$.

15. A process according to claim 1, in which said solution is a water-alcohol mixture.

16. A process according to claim 1, in which said solution is acidic.

* * * * *